Patented Mar. 3, 1942

2,275,311

UNITED STATES PATENT OFFICE 2,275,311

PROCESS FOR NUCLEAR ALKYLATION OF AMINO PHENOLS AND PRODUCT THEREOF

Charles J. Pedersen, Penns Grove, and Viktor Weinmayr, Pitman, N. J., assignors to E. I. du Pont de Nemours & Company, Wilmington, Del., a corporation of Delaware No Drawing. Application June 29, 1938, Serial No. 216,584

9 Claims. (Cl. 260—574)

This invention relates to the preparation of nuclear alkylated amino phenols and more particularly to the preparation of nuclear alkylated N-substituted amino phenols in the presence of an acid condensing agent.

It is known that some aromatic compounds will undergo nuclear alkylation in the presence of suitable condensing agents. Aromatic amines will not undergo direct nuclear alkylation by any method known to applicants. This is usually ascribed to the presence of the amino group.

This invention has as an object the preparation of nuclear alkylated amino phenols, particularly nuclear alkylated N-substituted amino phenols. A further object is a process of preparing nuclear alkylated amino phenols, particularly N-substituted amino phenols in good yield. Other objects will appear hereinafter.

The objects of the invention have been accomplished by condensing, in the presence of an acid condensing agent, an amino phenol with an alkylating agent having an alkyl group containing from three to six carbon atoms. Alcohols, ethers and olefins are preferred alkylating agents. While the process is applicable to amino phenols in general, it is found to be particularly adapted to the nuclear alkylation of N-substituted amino phenols. The acid condensing agent is preferably concentrated sulfuric acid. By the process of the present invention, a large number of new and valuable compounds have been produced.

The following examples will serve to illustrate the invention but it is to be understood that the invention is not limited thereto. Unless otherwise specified, the parts given are by weight.

EXAMPLE I.—*Mixed mono- and di-isopropyl-N-monomethyl-p-amino phenols from N-monomethyl-p-amino phenol and isopropyl alcohol*

An alkylating mixture was prepared by adding 343 parts of 100% sulfuric acid to 180 parts of isopropyl alcohol. The temperature of the mixture was held below 30° C. during this addition, and when addition was complete the temperature was held at 40–50° C. for one hour. This alkylating mixture was then added to 172 parts of N-monomethyl-p-amino phenol neutral sulfate dissolved in 1400 parts of 75% sulfuric acid. (The total acid was 1743 parts of 80% sulfuric acid.) The reaction mixture was held at about 60° C. for 24 hours. It was then diluted, treated with excess ammonium hydroxide and extracted with 1500 parts by volume of benzene. After removal of the benzene by distillation, the residual base was distilled under reduced pressure. The product was 137 parts of a yellow oil, B. P. 136–141°/3 mm., which solidified on standing and contained 7.36% nitrogen. This corresponds to a mixture of alkyl N-monomethyl-p-amino phenols containing an average of 1.60 isopropyl groups.

Di-isopropyl N-monomethyl-p-amino phenol neutral sulfate was obtained by treating a sample of the reaction product with an equivalent weight of 10% sulfuric acid. Two crystallizations of the crude compound from water yielded a pure salt, M. P. 213–215° C. with decomposition (evac. tube) containing 5.26% nitrogen and 6.0% sulfur. The theory for di-isopropyl-N-monomethyl-p-amino phenol neutral sulfate ($C_{26}H_{44}O_6N_2S$) is 5.46% nitrogen and 6.26% sulfur. A sample of the purified salt was suspended in water, treated with excess ammonium hydroxide and extracted with ether. The ether extract was freed of solvent and the residue crystallized twice from a 1–4 mixture of benzene and 30–60° C. petroleum ether yielding pure di-isopropyl-N-monomethyl-p-amino phenol as cream colored, short needles, M. P. 77° C.

When a sample of the crude reaction product was dissolved in alcohol and treated with an equivalent weight of oxalic acid, mono-isopropyl-N-monomethyl-p-amino phenol neutral oxalate precipitated. This salt, when purified by three crystallizations from 50% alcohol, had the M. P. 208–210° C. with gas evolution (evac. tube) and contained 6.46% nitrogen, 63.05% carbon and 7.7% hydrogen. The theory for mono-isopropyl-N-monomethyl-p-amino phenol neutral oxalate ($C_{22}H_{32}O_6N_2$) is 6.66% nitrogen, 62.81% carbon and 7.68% hydrogen. The purified salt was converted to the base in the usual manner and crystallized from a 1–3 mixture of benzene and 30–60° C. petroleum ether yielding pure mono-isopropyl-N-monomethyl-p-amino phenol as light pink, square plates, M. P. 107° C.

EXAMPLE II.—*Mixed mono- and di-isopropyl N-monomethyl-p-amino phenols from N-monomethyl-p-amino phenol and isopropyl ether*

400 parts of 100% sulfuric acid was added to 153 parts of isopropyl ether at a temperature below 30° C. 123 parts of N-monomethyl-p-amino phenol was then added and the reaction mixture was held at 70–75° C. with agitation for 4 hours. It was then diluted and the sulfuric acid partially neutralized with caustic soda. An excess of soda ash was then added and the mixture was extracted with 400 parts by volume of benzene. After removal of the benzene by distillation, the residual base was distilled under reduced pressure. The product was 181 parts of a yellow oil, B. P. 130–162° C./3–4 mm., which slowly solidified on standing and contained 7.12% nitrogen. This corresponds to a mixture of mono- and di-isopropyl N-monomethyl-p-amino phenols containing an average of 1.75 isopropyl groups.

EXAMPLE III.—*Secondary-butyl N-monomethyl-p-amino phenol from N-monomethyl-p-amino phenol and secondary-butyl alcohol*

An alkylating mixture prepared according to Example I from 343 parts of 100% sulfuric acid and 222 parts of secondary-butyl alcohol was added to 172 parts of N-monomethyl-p-amino phenol neutral sulfate dissolved in 320 parts of 61% sulfuric acid. (The total acid was 663 parts of 80% sulfuric acid.) The reaction mixture was held at 60° C. for 24 hours and the product isolated in the same manner as in Example I. The yield was 78 parts of a yellow oil, B. P. 138–140° C./3 mm., containing 9.35% nitrogen. This corresponds to a mixture of N-monomethyl-p-amino phenol and secondary-butyl N-monomethyl-p-amino phenol containing an average of 0.47 secondary-butyl groups.

EXAMPLE IV.—*Mixed mono- and di-tertiary-butyl N-monomethyl-p-amino phenols from N-monomethyl-p-amino phenol and tertiary-butyl alcohol*

An alkylating mixture prepared according to Example I from 343 parts of 100% sulfuric acid and 222 parts of tertiary-butyl alcohol was added to 172 parts of N-monomethyl-p-amino phenol neutral sulfate dissolved in 475 parts of 82% sulfuric acid. (The total acid was 818 parts of 90% sulfuric acid.) The reaction mixture was held at 60° C. for 24 hours. It was then diluted, treated with an excess of soda ash and extracted with 1500 parts by volume of benzene. After removal of the benzene by distillation, the residual base was distilled under reduced pressure. The product was 148 parts of a yellow oil, B. P. 135–145° C./3 mm., which solidified on standing and contained 7.20% nitrogen. This corresponds to a mixture of alkyl N-monomethyl-p-amino phenols containing an average of 1.27 tertiary-butyl groups.

EXAMPLE V.—*Isoamyl N-monomethyl-p-amino phenol from N-monomethyl-p-amino phenol and isoamyl alcohol*

An alkylating mixture prepared according to Example I from 343 parts of 100% sulfuric acid and 264 parts of isoamyl alcohol was added to 172 parts of N-monomethyl-p-amino phenol neutral sulfate dissolved in 593 parts of 66% sulfuric acid. (The total acid was 936 parts of 79% sulfuric acid.) The reaction mixture was held at 60° C. for 36 hours and the product isolated in the same manner as in Example I. The yield was 51 parts of yellow oil, B. P. 130–135° C./3 mm., containing 9.74% nitrogen. This corresponds to a mixture of N-monomethyl-p-amino phenol and alkyl N-monomethyl-p-amino phenol containing an average of 0.29 isoamyl groups.

EXAMPLE VI.—*Mixed mono- and di-hexyl N-monomethyl-p-amino phenols from N-monomethyl-p-amino phenol and n-hexyl alcohol*

An alkylating mixture prepared according to Example I from 343 parts of 100% sulfuric acid and 306 parts of n-hexyl alcohol was added to 172 parts of N-monomethyl-p-amino phenol neutral sulfate dissolved in 320 parts of 61% sulfuric acid. (The total acid was 663 parts of 81% sulfuric acid.) The reaction mixture was held at 60° C. for 24 hours and the product isolated in the same manner as in Example I. Two fractions were obtained from distilling the product. The first fraction was a yellow oil, B. P. 135–150° C./3 mm., containing 9.37% nitrogen. This corresponds to a mixture of N-monomethyl-p-amino phenol and alkyl N-monomethyl-p-amino phenol containing an average of 0.31 hexyl groups. The second fraction was a yellow oil, B. P. 150–166° C./3 mm., containing 6.50% nitrogen. This corresponds to a mixture of alkyl N-monomethyl-p-amino phenols containing an average of 1.10 hexyl groups.

EXAMPLE VII.—*Mixed mono- and di-isopropyl N-monobutyl-p-amino phenols from N-monobutyl-p-amino phenol and isopropyl alcohol*

To an alkylating mixture prepared according to Example I from 343 parts of 100% sulfuric acid and 180 parts of isopropyl alcohol was added 165 parts of N-monobutyl-p-amino phenol dissolved in 475 parts of 82% sulfuric acid. (The total acid was 818 parts of 90% sulfuric acid.) The reaction mixture was held at 60° C. for 24 hours and the product isolated in the same manner as in Example I. The yield was 177 parts of yellow oil, B. P. 165–185° C./3 mm., containing 5.74% nitrogen. This corresponds to a mixture of alkyl-N-monobutyl-p-amino phenols containing an average of 1.88 isopropyl groups.

EXAMPLE VIII.—*Poly-isopropyl N-mono-octyl-p-amino phenols from N-mono-octyl-p-amino phenol and isopropyl alcohol*

To an alkylating mixture prepared according to Example I from 103 parts of 100% sulfuric acid and 27 parts of isopropyl alcohol was added to 33 parts of N-mono-octyl-p-amino phenol suspended in 144 parts of 82% sulfuric acid. (The total acid was 247 parts of 90% sulfuric acid.) The reaction mixture was held at 60° C. with agitation for 24 hours. It was then diluted, treated with excess ammonium hydroxide and extracted with 500 parts by volume of ether. After removal of ether from the extract by distillation, the residue was distilled under reduced pressure. The product was 25 parts of a yellow oil, B. P. 185–215° C./3 mm., containing 4.37% nitrogen. This corresponds to a mixture of alkyl N-mono-octyl-p-amino phenols containing an average of 2.36 isopropyl groups.

EXAMPLE IX.—*Poly-isopropyl N-mono-phenyl-p-amino phenols from N-mono-phenyl-p-amino phenol and isopropyl alcohol*

To an alkylating mixture prepared according to Example I from 172 parts of 100% sulfuric acid and 90 parts of isopropyl alcohol was added 93 parts of 4-hydroxy diphenyl amine dissolved in 988 parts of 88% sulfuric acid. (The total acid was 1150 parts of 91% sulfuric acid.) The reaction mixture was held at 60° C. with agitation for 24 hours and the product isolated in the same manner as in Example I. The yield was 51 parts of a yellow oil, B. P. 185–200° C./3 mm., which slowly crystallized on standing and contained 5.01% nitrogen. This corresponds to a mixture of alkyl N-mono-phenyl-p-amino phenols containing an average of 2.21 isopropyl groups.

EXAMPLE X.—*Mixed mono- and di-isopropyl N-mono-benzyl-p-amino phenols from N-mono-benzyl-p-amino phenol and isopropyl alcohol*

An alkylating mixture prepared according to Example I from 343 parts of 100% sulfuric acid and 180 parts of isopropyl alcohol was added to 199 parts of N-mono-benzyl-p-amino phenol dissolved in 475 parts of 82% sulfuric acid. (The total acid was 818 parts of 90% sulfuric acid.) The reaction mixture was held at 60° C. with agitation for 24 hours. It was then diluted, treated with excess ammonium hydroxide, cooled and extracted with 1500 parts by volume of ether. The ethereal extract was dried over anhydrous sodium sulfate, refluxed for one hour with 20 parts of activated charcoal to remove color and filtered. Most of the ether was then removed by distillation and the residue freed of solvent at 80° C. and 3 mm. pressure. The residue was a viscous, reddish-yellow oil containing 5.03% nitrogen. This corresponds to a mixture of alkyl N-mono-benzyl-p-amino phenols containing an average of 1.88 isopropyl groups. The oil could not be distilled in vacuo and appeared to decompose rapidly at about 200° C. and 3 mm. pressure.

EXAMPLE XI.—*Di-isopropyl-p-hydroxy phenyl glycine from p-hydroxy phenyl glycine and isopropyl ether*

468 parts of 100% sulfuric acid was slowly added to 156 parts of isopropyl ether at a temperature below 30° C. When addition was complete, the temperature of the mixture was raised to 50° C., and 168 parts of p-hydroxy phenyl glycine was added during about 15 minutes. The reaction mixture was then held at 75° C. with agitation for 18 hours, after which time it was diluted with 3000 parts of water and partially neutralized with 540 parts of concentrated ammonium hydroxide solution. The temperature of the solution increased to about 80° C. during the dilution and partial neutralization, and a white precipitate formed. After cooling, the precipitate was filtered off, washed with cold water and dried. The yield was 205 parts of white crystals consisting mainly of di-isopropyl-p-hydroxy phenyl glycine and containing 5.29% nitrogen. The theory is 5.58% nitrogen.

The product forms a sulfate only with strong sulfuric acid and is soluble in dilute soda ash solution. It can be crystallized from alcohol, in which it is soluble to the extent of 1 part in 30 at the boiling point and in which it is very insoluble cold. On heating the product to about 180° C. decarboxylation occurs and di-isopropyl N-monomethyl-p-amino phenol is formed.

EXAMPLE XII.—*Mixed mono- and di-isopropyl 1-methyl-2-N-ethyl-amino-4-hydroxy-benzenes from 1-methyl-2-N-ethyl-amino-4-hydroxy-benzene and isopropyl alcohol*

To an alkylating mixture prepared according to Example I from 343 parts of 100% sulfuric acid and 180 parts of isopropyl alcohol was added 151 parts of 1-methyl-2-N-ethyl-amino-4-hydroxy benzene dissolved in 475 parts of 82% sulfuric acid. (The total acid was 818 parts of 90% sulfuric acid.) The reaction mixture was held at 60° C. with agitation for 24 hours and the product isolated in the same manner as in Example I. The yield was 177 parts of a yellow oil, B. P. 145–160° C./3 mm., which promptly crystallized and contained 6.24% nitrogen. This corresponds to a mixture of alkyl 1-methyl-2-N-ethyl-amino-4-hydroxy-benzenes containing an average of 1.74 isopropyl groups.

EXAMPLE XIII.—*Di-isopropyl-N-mono-methyl-o-amino phenol from N-mono-methyl-o-amino phenol and isopropyl alcohol*

An alkylating mixture prepared according to Example I from 137 parts of 100% sulfuric acid and 72 parts of isopropyl alcohol was added to 69 parts of N-monomethyl-o-amino phenol neutral sulfate suspended in 190 parts of 82% sulfuric acid. (The total acid was 327 parts of 90% sulfuric acid.) The reaction mixture was held at 60° C. with agitation for 24 hours and the product isolated in the same manner as in Example I. The product was 67 parts of di-isopropyl N-mono-methyl-o-amino phenol. It was obtained as a yellow oil, B. P. 135–140° C./3 mm., which promptly crystallized and contained 6.68% nitrogen. The theory is 6.76% nitrogen.

EXAMPLE XIV.—*Mono- and di-isopropyl N-dimethyl-p-amino phenol from N-dimethyl-p-amino phenol and isopropyl ether*

214 parts of isopropyl ether was added to a solution of 364 parts of N-dimethyl-p-amino phenol neutral oxalate in 1175 parts of anhydrous hydrofluoric acid at 8–10° C. over a period of 2 hours. The temperature was then raised to 20–25° C. and the charge was agitated at this temperature for about 20 hours, after which time some of the excess hydrofluoric acid was removed by holding the charge at 50–70° C. for several hours. The reaction product was then poured into 2000 parts of cracked ice, treated with excess ammonium hydroxide and extracted with 750 parts by volume of benzene. The benzene solution was washed with water and fractionated. After distillation of the benzene a small amount of a polymerization product derived from isopropyl ether was obtained. Then 150 parts of mono-isopropyl N-dimethyl-p-amino phenol B. P. 137° C./3 mm., and 40 parts of di-isopropyl N-dimethyl-p-amino phenol B. P. 148° C./3 mm., were obtained. Both compounds are low melting crystalline solids which are completely soluble in dilute hydrochloric acid and very insoluble in dilute caustic soda solution or in water.

EXAMPLE XV.—*Mixed mono- and di-tertiary-butyl N-dimethyl-p-amino phenols from N-dimethyl-p-amino phenol and tertiary-butyl alcohol*

An alkylating mixture prepared according to Example I from 343 parts of 100% sulfuric acid and 222 parts of tertiary-butyl alcohol was added to 182 parts of N-dimethyl-p-amino phenol neutral oxalate dissolved in 475 parts of 82% sulfuric acid. (The total acid was 818 parts of 90% sulfuric acid.) The reaction mixture was held at 60° C. for 24 hours and the product isolated in the same manner as in Example I. The yield was 139 parts of a yellow oil, B. P. 115–125° C./3 mm., containing 7.72% nitrogen. This corresponds to a mixture of alkyl N-dimethyl-p-amino phenols containing an average of 0.79 tertiary-butyl groups.

EXAMPLE XVI.—*Mixed mono- and di-cyclohexyl N-dimethyl-p-amino phenols from N-dimethyl-p-amino phenol and cyclo-hexyl alcohol*

An alkylating mixture prepared according to Example I from 343 parts of 100% sulfuric acid and 300 parts of cyclo-hexyl alcohol was added to 182 parts of N-dimethyl-p-amino phenol neutral oxalate dissolved in 475 parts of 82% sulfuric acid. (The total acid was 818 parts of 90% sulfuric acid.) The reaction mixture was held at 60° C. for 24 hours and the product isolated in the same manner as in Example I. The yield was 72 parts of a yellow oil, B. P. 165–180° C./3 mm., which crystallized on standing and contained 4.94% nitrogen. This corresponds to a mixture of alkyl N-dimethyl-p-amino phenols containing an average of 1.78 cyclo-hexyl groups.

EXAMPLE XVII.—*Mixed mono- and di-isopropyl N-dibenzyl p-amino phenols from N-dibenzyl-p-amino phenol and isopropyl ether*

153 parts of isopropyl ether was added to a solution of 433 parts of N-dibenzyl-p-amino phenol in 1025 parts of anhydrous hydrofluoric acid at 8–10° C. over a period of 2 hours. The temperature was then raised to 20–25° C. and the charge agitated at this temperature for about 20 hours, after which time some of the excess hydrofluoric acid was removed by holding the charge at 50° C. for 4 hours. The reaction product was then poured into 2000 parts of cracked ice. A precipitate formed which was filtered off and washed with cold water. It was then heated to 80–85° C. for 15 minutes with an excess of ammonium hydroxide. A heavy oil precipitated and was washed several times with hot water by decantation and dried on a steam bath. The oil was then distilled under reduced pressure, yielding 200 parts of a yellow oil, B. P. 240–250° C./3 mm., containing 4.18% nitrogen. This corresponds to a mixture of alkyl N-dibenzyl-p-amino phenols containing an average of 1.10 isopropyl groups.

EXAMPLE XVIII.—*Mixed mono- and di-isopropyl N-N'-dimethyl-N - N' - di(p - hydroxy phenyl) ethylene diamines from N-N'-dimethyl-N-N'-di(p-hydroxy phenyl) ethylene diamine and isopropyl ether*

45 parts of isopropyl ether was added to a solution of 40.5 parts of N-N'-dimethyl-N-N'-di(p-hydroxy phenyl) ethylene diamine in 80 parts anhydrous hydrofluoric acid at 8–10° C. over a period of 2 hours. The charge was then sealed in a steel autoclave and held at 50° C. with agitation for 4 hours. After cooling, the charge was poured into 1000 parts of cracked ice, made alkaline with ammonium hydroxide and extracted with 200 parts by volume of hot benzene. After concentrating the benzene solution to one-fourth its volume and cooling, 17 parts of unchanged diamine precipitated and was filtered off. The filtrate was freed of solvent and the residue distilled under reduced pressure. The yield was 15 parts of a brown oil, B. P. 260–265° C./3 mm., containing 8.89% nitrogen. This corresponds to a mixture of alkyl N-N'-dimethyl-N-N'-di(p-hydroxy phenyl) ethylene diamines containing an average of 1.26 isopropyl groups.

EXAMPLE XIX.—*Mixed mono- and di-isopropyl N-methyl-N-butyl-p-amino phenols from N-methyl-N-butyl-p-amino phenol and isopropyl alcohol*

An alkylating mixture prepared according to Example I from 302 parts of 100% sulfuric acid and 159 parts of isopropyl alcohol was added to 159 parts of N-methyl-N-butyl-p-amino phenol dissolved in 418 parts of 82% sulfuric acid. (The total acid was 720 parts of 90% sulfuric acid.) The reaction mixture was held at 60° C. for 24 hours and the product isolated in the same manner as in Example I. The yield was 175 parts of a yellow oil, B. P. 140–155° C./3 mm., containing 6.05% nitrogen. This corresponds to a mixture of alkyl N-methyl-N-butyl-p-amino phenols containing an average of 1.25 isopropyl groups.

EXAMPLE XX.—*Mixed mono- and di-isopropyl N-(4-hydroxy phenyl) morpholines from N-(4-hydroxy phenyl) morpholine and isopropyl alcohol*

An alkylating mixture prepared according to Example I from 274 parts of 100% sulfuric acid and 144 parts of isopropyl alcohol was added to 143 parts of N-(4-hydroxy phenyl) morpholine suspended in 380 parts of 82% sulfuric acid. (The total acid was 654 parts of 90% sulfuric acid.) The reaction mixture was held at 60° C. with agitation for 24 hours and the product isolated in the same manner as in Example I. The yield was 134 parts of a yellow oil, B. P. 165–180° C./3 mm., which rapidly crystallized and contained 6.45% nitrogen. This corresponds to a mixture of alkyl N-(4-hydroxy phenyl) morpholines containing an average of 1.12 isopropyl groups. Two crystallizations of the product from benzene yielded pure mono-isopropyl N-(4-hydroxy phenyl) morpholine as white crystals, M. P. 136.5–137° C.

EXAMPLE XXI.—*Isopropyl N-diethyl - m - amino phenol from N-diethyl-m-amino phenol and isopropyl alcohol*

An alkylating mixture prepared according to Example I from 343 parts of 100% sulfuric acid and 180 parts of isopropyl alcohol was added to 165 parts of N-diethyl-m-amino phenol dissolved in 475 parts of 82% sulfuric acid. (The total acid was 818 parts of 90% sulfuric acid.) The reaction mixture was held at 60° C. for 24 hours and the product isolated in the same manner as in Example I. The yield was 155 parts of a yellow oil, B. P. 110–145° C./3 mm., containing 7.13% nitrogen. This corresponds to a mixture of N-diethyl-m-amino phenol and isopropyl N-diethyl-m-amino phenol containing an average of 0.70 isopropyl groups.

EXAMPLE XXII.—*Di-isopropyl - p - amino phenol from p-amino phenol and isopropyl alcohol*

An alkylating mixture prepared according to Example I from 343 parts of 100% sulfuric acid and 180 parts of isopropyl alcohol was added to 109 parts of p-amino phenol suspended in 475 parts of 82% sulfuric acid. (The total acid was 818 parts of 90% sulfuric acid.) The reaction mixture was held at 60° C. with agitation for 24 hours, during which time a large amount of crystalline material precipitated. It was then diluted with 1600 parts of water, cooled and filtered. The precipitate was crystallized once from 1500 parts of water, filtered and dried. The yield was 180 parts of di-isopropyl-p-amino phenol neutral sulfate as light pink crystals. A second crystallization from water yielded white crystals, M. P. 206–208° C. with decomposition (evac. tube), containing 5.65% nitrogen and 6.5% sulfur. The theory for di-isopropyl-p-amino phenol neutral sulfate ($C_{24}H_{40}O_6N_2S$) is 5.78% nitrogen and 6.60% sulfur.

EXAMPLE XXIII.—*Mixed mono and di-tertiary-butyl-o-amino phenols from o-amino-phenol and tertiary-butyl alcohol*

To an alkylating mixture prepared according to Example I from 666 parts of tertiary-butyl alcohol and 1458 parts of 100% sulfuric acid was added 330 parts of o-amino-phenol. The reaction mixture was held at 70° C. with agitation for 18 hours. It was then poured with stirring into 3,000 parts of ice and 1500 parts of water. A dark precipitate formed and was filtered off, slurried well with 2,000 parts of water, filtered and dried. The product was then slurried with 2,000 parts by volume of ether in two portions. The yield was 550 parts of white crystals. A sample, after three crystallizations from 20% alcohol, contained 5.65% nitrogen and 6.6% sulfur. This corresponds to a mixture of alkyl-o-amino-phenol neutral sulfates containing an average of 1.6 tertiary butyl groups.

EXAMPLE XXIV.—*Mixed mono- and di-isopropyl-N-methyl-p-amino-phenols from N-methyl-p-amino-phenol and isopropyl alcohol in o-phosphoric acid*

180 parts of phosphorus pentoxide was slowly added to 456 parts of 85% ortho-phosphoric acid with cooling and stirring. 90 parts of isopropyl alcohol was then added with stirring at a temperature below 20° C. and the mixture allowed to stand for 18 hours at room temperature, after which time 62 parts of N-methyl-p-amino-phenol was added. The reaction mixture was held at 135° C. with agitation for 48 hours. It was then diluted, treated with excess ammonium hydroxide and extracted with 1,000 parts by volume of benzene. The extract was freed of solvent by distillation and the residue distilled under reduced pressure. The product was 61 parts of a yellow oil, B. P. 125–145° C./3 mm., which crystallized on standing and contained 7.10% nitrogen. This corresponds to a mixture of alkyl N-methyl-p-amino-phenols containing an average of 1.76 isopropyl groups.

EXAMPLE XXV.—*Mixed mono- and di-isopropyl-N-methyl-p-amino-phenols from N-methyl-p-amino-phenol and propylene*

Propylene was slowly bubbled through 690 parts of 100% sulfuric acid held below 30° C. until 145 parts of propylene had been added. To this alkylating mixture was added 198 parts of N-methyl-p-amino-phenol neutral sulfate. The reaction mixture was held at 60° C. with agitation for 24 hours and the product isolated in the same manner as in Example I. The yield was 68 parts of a yellow oil, B. P. 120–130° C./2 mm., which promptly solidified and contained 7.09% nitrogen. This corresponds to a mixture of alkyl N-mono-methyl-p-amino-phenols containing an average of 1.77 isopropyl groups.

EXAMPLE XXVI.—*Di-isopropyl-N-acetyl-p-amino-phenol from N-acetyl-p-amino-phenol and isopropyl alcohol*

To an alkylating mixture prepared according to Example I from 343 parts of 100% sulfuric acid and 180 parts of isopropyl alcohol was added 151 parts of N-acetyl-p-amino-phenol suspended in 475 parts of 82% sulfuric acid. (The total acid was 818 parts of 90% sulfuric acid.) The reaction mixture was held at 60° C. with agitation for 24 hours, then poured onto 3,000 parts of cracked ice. A crystalline precipitate formed which was filtered off, crystallized from 2400 parts by volume of 50% alcohol and then from 4,000 parts by volume of benzene. The product was 136 parts of di-isopropyl N-acetyl-p-amino-phenol as white crystals, M. P. 168.5–169° C. containing 5.76% nitrogen. The theory is 5.96% nitrogen.

EXAMPLE XXVII.—*Di-isopropyl-N-dodecyl-p-amino-phenol from N-dodecyl-p-amino-phenol and isopropyl alcohol*

An alkylating mixture prepared according to Example I from 69 parts of 100% sulfuric acid and 10 parts of isopropyl alcohol was added to 16 parts of N-dodecyl-p-amino-phenol suspended in 95 parts of 82% sulfuric acid. (The total acid was 164 parts of 90% sulfuric acid.) The reaction mixture was held at 60° C. with agitation for 24 hours. It was then diluted, treated with excess ammonium hydroxide, cooled and extracted with 500 parts by volume of ether. The extract was freed of solvent by distillation and the residue crystallized three times from benzene. Di-isopropyl-N-dodecyl-p-amino-phenol was obtained as waxy brown crystals M. P. 112° C. (softens at 96° C.), containing 4.07% nitrogen. The theory is 3.87% nitrogen. This compound could not be distilled in vacuo, and appears to decompose at about 180° C./3 mm.

EXAMPLE XXVIII.—*Isopropyl-N-dibenzyl-p-amino-phenol from N-dibenzyl-p-amino-phenol and isopropyl alcohol*

An alkylating mixture prepared according to Example I from 343 parts of 100% sulfuric acid and 180 parts of isopropyl alcohol was added to 289 parts of N-dibenzyl-p-amino-phenol suspended in 475 parts of 82% sulfuric acid. (The total acid was 819 parts of 90% sulfuric acid.) The reaction mixture was held at 60° C. with agitation for 24 hours. It was then diluted, treated with excess ammonium hydroxide, cooled and extracted with 3,000 parts by volume of ether. The extract was freed of solvent by distillation and the residue distilled under reduced pressure. The yield was 192 parts of isopropyl-N-dibenzyl-p-amino-phenol, B. P. 210–220° C./3 mm., containing 4.25% nitrogen. The theory is 4.23% nitrogen.

The process, using sulfuric acid, may be generalized as follows:

An excess of strong sulfuric acid (preferably 100%) is added to the alkylating agent. During the addition, the temperature is held below 30° C. to prevent polymerization, and when addition is complete the temperature is allowed to rise to 40–50° C. for a short time (although this is not always necessary) in order to complete the reaction. To this alkylating mixture is added the amino phenol derivative to be alkylated, either alone or dissolved or suspended in strong sulfuric acid. The amount of alkylating agent used depends upon the degree of alkylation desired. The use of one to one and one-half moles of alcohol or olefin or one-half to three-fourths mole of ether per mole of amino phenol derivative favors the formation of a mono-alkylated amino phenol derivative. The use of two to three moles of alcohol or olefin or one to one and one-half moles of ether per mole of amino phenol derivative favors the formation of a dialkylated amino-phenol derivative. The alkyl radical of the alcohol or ether used may be primary, secondary, tertiary or cyclic (preferably not primary) and the olefin used may be a straight chain, branched chain or cyclic olefin. The strength of the sulfuric acid used is preferably 80% to 100% but may be less, and the amount of sulfuric acid used is preferably four to eight moles of acid per mole of aminophenol derivative but may be more or less. The reaction mixture is heated at 60° to 75° C. from 4 to 24 hours depending upon the nature of the reactants. Longer heating is not deleterious. Higher temperatures may be used but result in loss of yield due to polymerization of the alkylating agent and to sulfonation of the amino phenol derivative. When not homogeneous, the reaction mixture is preferably stirred during the reaction but stirring is not necessary. The reaction product is isolated from the reaction mixture by known methods for isolating amino phenol derivatives, for example, the sulfate may be filtered directly from the reaction mixture, or the reaction mixture may be made alkaline with ammonia, soda ash or caustic and the product extracted into a suitable solvent such as benzene or ether, and is purified by known methods for purifying amino phenol derivatives, for example, by crystallization as the base or as a salt or through distillation of the base.

Except that it is preferable to prepare an alkylating mixture of the alkylating agent with 100% sulfuric acid, the order of addition of the reactants is immaterial. The amino phenol derivative in the form of the base or a salt or in a sulfuric acid solution or suspension may be added to the alkylating mixture or vice versa. The formation of an alkylating mixture, although preferable, is not essential to the success of the reaction. Alkylation proceeds in appreciable yields when the alcohol, ether or olefin is simply added to a solution of the amino phenol derivative in 70–90% sulfuric acid. While the acid condensing agent is preferably sulfuric acid, other acid condensing agents may be used such as hydrofluoric acid and phosphoric acid.

The alkyl radical can be introduced by means of any alkylating agent having from three to six carbon atoms in the alkyl group, but efforts to carry out the process with alkylating agents containing less than three or more than six carbon atoms have been unsuccessful. Alkylating agent as used herein includes unsaturated hydrocarbons and compounds which, under the conditions of the reaction, will give unsaturated hydrocarbons by the elimination of water, hydrogen sulfide, hydrogen halide, alcohols, acids, mercaptans or amines. The preferred alkylating agents are alcohols, olefins and ethers, and the preferred alkyl group is isopropyl.

The alkylating process of the present invention is applicable to any amino phenol. Moreover, the amino phenol may also be substituted in the nucleus with such groups as alkyl, aralkyl, aryl, —COR, —COOR, —CN, —OR, —SH, —SR and halogen. The presence of such groups in the N-side chain of N-substituted amino phenols does not, in general, prevent alkylation. The alkylating alcohol, olefin or ether may, in general, be substituted by such groups as —COR, —COOR, —CN, —OR, —SH and halogen. As has been previously stated, the N-substituted amino phenols are the preferred reactants although primary amino phenols may be used. The N-substituted para amino phenols are especially preferred. Extensive search has failed to show any inoperative N-substituent. However, it is preferred that the N-substituent shall have not more than eight carbon atoms. The methyl group is especially preferred as the N-substituent. As is evident from the examples, either one or both of the hydrogens of the amino group may be substituted by alkyl, aryl or aralkyl. In fact, the two amino hydrogens may be substituted by a heterocyclic ring.

New compounds of the following types have been prepared from amino phenols and alcohols, ethers or olefins in the presence of an acid condensing agent:

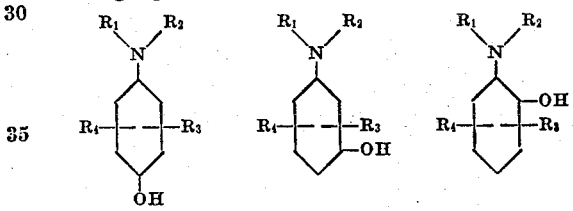

Where $R_1$ is a hydrogen atom or an alkyl, aralkyl or aryl group containing one or more carbon atoms.

$R_2$ is a hydrogen atom or an alkyl, aralkyl or aryl group containing one or more carbon atoms. $R_1$ and $R_2$ may or may not be alike and may be joined in a heterocyclic ring.

$R_3$ is a straight chain, branched chain or cyclic alkyl group containing three to six carbon atoms.

$R_4$ is a hydrogen atom or a straight chain, branched chain or cyclic alkyl group containing three to six carbon atoms.

These compounds are described in Table I.

TABLE I

Compounds of the formula:

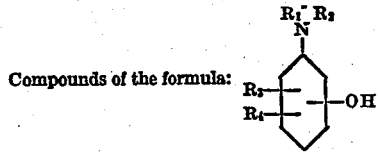

| Ex. | Position of OH | $R_1$ | $R_2$ | $R_3$ | $R_4$ | Alkylating agent | Condensing agent | Product |
|---|---|---|---|---|---|---|---|---|
| 22 | Para | H | H | Isopropyl | Isopropyl | Alcohol | $H_2SO_4$ | Pure. |
| 1 | Para | Methyl | H | Isopropyl | H | Alcohol | $H_2SO_4$ | Pure. |
| 1 | Para | Methyl | H | Isopropyl | Isopropyl | Alcohol | $H_2SO_4$ | Pure. |
| 2 | Para | Methyl | H | Isopropyl | H | Ether | $H_2SO_4$ | }Mixture. |
| 2 | Para | Methyl | H | Isopropyl | Isopropyl | Ether | $H_2SO_4$ | |
| 3 | Para | Methyl | H | Sec. butyl | H | Alcohol | $H_2SO_4$ | (*) |
| 4 | Para | Methyl | H | Tert. butyl | H | Alcohol | $H_2SO_4$ | }Mixture. |
| 4 | Para | Methyl | H | Tert. butyl | Tert. butyl | Alcohol | $H_2SO_4$ | |
| 5 | Para | Methyl | H | Isoamyl | H | Alcohol | $H_2SO_4$ | (*) |
| 6 | Para | Methyl | H | Hexyl | H | Alcohol | $H_2SO_4$ | }Mixture. |
| 6 | Para | Methyl | H | Hexyl | Hexyl | Alcohol | $H_2SO_4$ | |
| 11 | Para | -$CH_2COOH$ | H | Isopropyl | Isopropyl | Ether | $H_2SO_4$ | Fairly pure. |
| 7 | Para | Butyl | H | Isopropyl | H | Alcohol | $H_2SO_4$ | }Mixture. |
| 7 | Para | Butyl | H | Isopropyl | Isopropyl | Alcohol | $H_2SO_4$ | |
| 8 | Para | Octyl | H | Isopropyl | Isopropyl | Alcohol | $H_2SO_4$ | Fairly pure. |

*Mixture with starting material.

| Ex. | Position of OH | R₁ | R₂ | R₃ | R₄ | Alkylating agent | Condensing agent | Product |
|---|---|---|---|---|---|---|---|---|
| 10 | Para | Benzyl | H | Isopropyl | H | Alcohol | H₂SO₄ | }Mixture. |
| 10 | Para | Benzyl | H | Isopropyl | Isopropyl | Alcohol | H₂SO₄ | |
| 9 | Para | Phenyl | H | Isopropyl | Isopropyl | Alcohol | H₂SO₄ | Fairly pure. |
| 14 | Para | Methyl | Methyl | Isopropyl | H | Ether | HF | Pure. |
| 14 | Para | Methyl | Methyl | Isopropyl | Isopropyl | Ether | HF | Pure. |
| 15 | Para | Methyl | Methyl | Tert. butyl | H | Alcohol | H₂SO₄ | }Mixture. |
| 15 | Para | Methyl | Methyl | Tert. butyl | Tert. butyl | Alcohol | H₂SO₄ | |
| 16 | Para | Methyl | Methyl | Cyclohexyl | H | Alcohol | H₂SO₄ | }Mixture. |
| 16 | Para | Methyl | Methyl | Cyclohexyl | Cyclohexyl | Alcohol | H₂SO₄ | |
| 19 | Para | Methyl | Butyl | Isopropyl | H | Alcohol | H₂SO₄ | }Mixture. |
| 19 | Para | Methyl | Butyl | Isopropyl | Isopropyl | Alcohol | H₂SO₄ | |
| 18 | Para | Methyl | 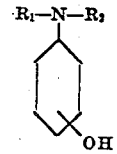 | Isopropyl | H | Ether | HF | }Mixture. |
| 18 | Para | Methyl | 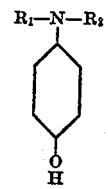 | Isopropyl | Isopropyl | Ether | HF | |
| 17 | Para | Benzyl | Benzyl | Isopropyl | H | Ether | HF | }Mixture. |
| 17 | Para | Benzyl | Benzyl | Isopropyl | Isopropyl | Ether | HF | |
| 20 | Para | CH₂—CH₂ \ O / CH₂—CH₂ | | Isopropyl | H | Alcohol | H₂SO₄ | Pure }Mixture. |
| 20 | Para | CH₂—CH₂ \ O / CH₂—CH₂ | | Isopropyl | Isopropyl | Alcohol | H₂SO₄ | |
| 12 | Meta | Ethyl | H | Isopropyl | H | Alcohol | H₂SO₄ | }Mixture. |
| 12 | Meta | Ethyl | H | Isopropyl | Isopropyl | Alcohol | H₂SO₄ | |
| 21 | Meta | Ethyl | Ethyl | Isopropyl | H | Alcohol | H₂SO₄ | (*) |
| 13 | Ortho | Methyl | H | Isopropyl | Isopropyl | Alcohol | H₂SO₄ | Fairly pure. |
| 23 | Ortho | H | H | Tert. butyl | H | Alcohol | H₂SO₄ | }Mixture. |
| 23 | Ortho | H | H | Tert. butyl | Tert. butyl | Alcohol | H₂SO₄ | |
| 24 | Para | Methyl | H | Isopropyl | H | Alcohol | H₃PO₄ | }Mixture. |
| 24 | Para | Methyl | H | Isopropyl | Isopropyl | Alcohol | H₃PO₄ | |
| 25 | Para | Methyl | H | Isopropyl | H | Olefin | H₂SO₄ | }Mixture. |
| 25 | Para | Methyl | H | Isopropyl | Isopropy. | Olefin | H₂SO₄ | |
| 26 | Para | Acetyl | H | Isopropyl | Isopropyl | Alcohol | H₂SO₄ | Pure. |
| 27 | Para | Dodecyl | H | Isopropyl | Isopropyl | Alcohol | H₂SO₄ | Pure. |
| 28 | Para | Benzyl | Benzyl | Isopropyl | H | Alcohol | H₂SO₄ | Pure. |

*Mixture with starting material.

In every instance of alkylation according to the method of the present invention, the alkylating group has been attached to the benzene nucleus of the amino phenol. This is an unexpected result, especially in view of the teaching of the prior art that many efforts at direct nuclear alkylation of aromatic amines have failed. Moreover, contrary to what might have been expected, in no instance was there evidence of N-alkylation or O-alkylation (ether formation) nor was there any evidence of sulfonation of the amino phenols under the conditions employed.

The reaction appears to be continuous and mixtures of nuclear mono- and di-alkylated derivatives are usually obtained. The mono- and di-alkylated derivatives are very similar in physical and chemical properties. They are difficult to separate from mixtures but for most applications, separation is neither desirable nor necessary. The nuclear alkylated amino phenol derivatives here described are useful as gasoline antioxidants, rubber antioxidants, dye intermediates and germicides. In general they have a higher stability and are more soluble in organic solvents and less soluble in water or caustic soda solution than the parent compounds.

Suitable changes may be made in the details of the process and any modifications or variations which conform to the spirit of the invention are intended to be included within the scope of the claims.

We claim:

1. A process for nuclear alkylation of amino phenols which comprises condensing, in the presence of an acid-condensing agent selected only from the group consisting of sulfuric acid, hydrofluoric acid and phosphoric acid, an alkylating agent having an alkyl group containing from three to six carbon atoms with an amino phenol of the formula $$R_1-N-R_2$$
(on benzene ring with OH)

wherein R₁ and R₂ each represent any member of the group consisting of hydrogen atoms, alkyl radicals, aralkyl radicals, and aryl radicals.

2. A process for nuclear alkylation of amino phenols which comprises condensing, in the presence of a single acid condensing agent selected from the group consisting of sulfuric acid, hydrofluoric acid and phosphoric acid, an alkylating agent having an alkyl group containing from three to six carbon atoms, said alkylating agent being selected from the group consisting of alcohols, ethers and olefins, with an amino phenol of the formula $$R_1-N-R_2$$
(on benzene ring with OH)

wherein R₁ and R₂ each represent any member of the group consisting of hydrogen atoms, alkyl radicals, aralkyl radicals, and aryl radicals.

3. A process according to claim 2 wherein the amino phenol is a primary amino phenol.

4. A process according to claim 2 wherein the amino phenol is a secondary amino phenol.

5. A process according to claim 2 wherein the amino phenol is a tertiary amino phenol.

6. A process for nuclear alkylation of amino phenols which comprises condensing, in the presence of concentrated sulfuric acid as the sole acid condensing agent, an alkylating agent having an alkyl group containing from three to six carbon atoms, said alkylating agent being selected from the group consisting of alcohols, ethers and olefins, with an amino phenol of the formula

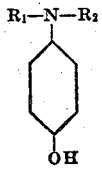

wherein $R_1$ and $R_2$ each represent any member of the group consisting of hydrogen atoms, alkyl radicals, aralkyl radicals, and aryl radicals.

7. A process according to claim 6 wherein the amino phenol is a primary amino phenol.

8. A process according to claim 6 wherein the amino phenol is a secondary amino phenol.

9. A process according to claim 6 wherein the amino phenol is a tertiary amino phenol.

CHARLES J. PEDERSEN.
VIKTOR WEINMAYR.